United States Patent [19]

Itoi

[11] Patent Number: 5,188,338
[45] Date of Patent: Feb. 23, 1993

[54] FLUID FLOW CONTROLLER

[75] Inventor: Shigeru Itoi, Mie, Japan

[73] Assignee: Masako Kiyohara, Kumamoto, Japan

[21] Appl. No.: 821,386

[22] Filed: Dec. 23, 1991

[30] Foreign Application Priority Data

Jan. 11, 1991 [JP] Japan .................................. 3-3854

[51] Int. Cl.[5] ............................................. F16K 31/50
[52] U.S. Cl. .................................. 251/265; 251/335.2
[58] Field of Search ............................. 251/265, 335.2

[56] References Cited

U.S. PATENT DOCUMENTS

| | | | |
|---|---|---|---|
| 2,388,989 | 11/1945 | Mueser | 251/265 |
| 2,654,559 | 10/1953 | Franck | 251/335.2 X |
| 2,812,777 | 11/1957 | Dahl | 251/335.2 X |
| 3,409,271 | 11/1968 | Kallenbach | 251/265 |
| 3,428,291 | 2/1969 | Callahan et al. | 251/265 X |

FOREIGN PATENT DOCUMENTS

| | | | |
|---|---|---|---|
| 532655 | 2/1922 | France | 251/265 |
| 1-176275 | 12/1989 | Japan | |
| 23961 | of 1913 | United Kingdom | 251/265 |

*Primary Examiner*—Stephen M. Hepperle
*Attorney, Agent, or Firm*—Griffin Butler Whisenhunt & Kurtossy

[57] ABSTRACT

In a diaphragm type control valve, a slide stem (14) having a coupling screw part (14a) is elevatably but non-rotatably inserted into a bonnet (11) having a coupling screw part (11c). A rotary stem (15) has concentrically a first coupling screw part (22) of thread pitch P1 inside, and a second coupling screw part (23) of thread pitch P2 larger than the thread pitch P1 outside is coaxially disposed above the slide stem (14), the first coupling screw part (22) being driven into the coupling screw part (14 c) of the slide stem (14), and the second coupling screw part (23) into the coupling screw part (11c) of the bonnet (11), so that the slide stem (14) is moved vertically by a small distance at each revolution of the rotary stem (15).

6 Claims, 2 Drawing Sheets

FLUID FLOW CONTROLLER

The present invention relates to a fluid flow controller for adjustment of small flow rates used in semiconductor manufacturing equipment or the like, and more particularly to a fluid controller simple in structure and capable of adjusting minutely a small flow rate accurately in a simple structure.

The accompanying drawings are:

FIG. 1 a longitudinal section of a controller of the invention;

FIG. 2 a sectional view of A—A in FIG. 1;

FIG. 3 a longitudinal section showing a conventional example of a diaphragm type controller.

A fluid controller for high purity gas used in semiconductor manufacturing equipment or the like is strictly required to have so-called particle-free or dead space-free characteristics. Accordingly, in the field of semiconductor manufacture, the diaphragm type control valves (especially direct diaphragm valves) are widely used because they are structurally easy to satisfy the requirements of particle-free (reducing the generation of dust particles due to wear) and dead space-free (reducing the space for allowing the fluid to stay) properties.

Generally, however, since the diaphragm type control valves have a very small working stroke of the diaphragm, they are inherently difficult to adjust.

To solve the problem of flow rate adjustment of diaphragm type control valve, for example, a control valve has been developed for fine adjustment of the stroke of the valve body by reducing the revolutions of the valve handle by using a gear type speed reduction mechanism. This diaphragm type control valve having a valve drive unit in gear mechanism is complicated in the structure of the valve drive unit and large in size, so that the size of the control valve cannot be reduced.

The present applicant previously developed a controller in a structure as shown in FIG. 3 of the accompanying drawings as the means for enabling accurate adjustment of a small flow rate in a diaphragm type control valve, and disclosed it in the Japanese laid-open Utility Model Hei.1-176275. That is, by varying the input voltage applied to a piezoelectric element A and controlling its elongation amount, a valve body C is moved up and down through a diaphragm B to adjust the gap between the valve body C and valve seat D, and a micrometer E is disposed above the piezoelectric element A, and a pressing force applied to the valve body C is adjusted always at a specific pressure through the piezoelectric element A.

This controller is capable of automatically controlling the flow rate of a small flow gas of a small flow gas of about 100 to 500 cc/min relatively at a high precision, and presents an excellent practical effect.

The controller in FIG. 3, however, also presents problems as below:

1) The basic operation is the automatic flow control, and manual adjustment of flow rate is not easy.
2) The vertical dimension of the valve drive unit including the piezoelectric element and micrometer is extremely extended, and the control valve cannot be downsized.
3) When the gas flow rate to be controlled becomes large, it is necessary to increase the stroke, and a large piezoelectric element is needed, which is difficult to realise.
4) The manufacturing cost is raised because the control device of piezoelectric element and others are necessary.

It is hence a primary object of the invention to solve the problems of the conventional controller by presenting a fluid controller simple in structure, notably reduced in size, capable of controlling a small flow rate at high precision not only by automatic operation but also by manual operation, and capable of greatly reducing the manufacturing cost. A differential screw mechanism for driving the valve stem is proposed.

To achieve the above object, the invention presents a fluid controller for a diaphragm type control valve disposing a diaphragm 6 (see FIGS. 1 and 2) in a valve casing 1 comprising a fluid inlet 2, a fluid outlet 3, a valve seat 4, and a valve compartment 5, and designed to close a fluid passage by lowering the diaphragm 6 by lowering an elevatably disposed stem by penetrating through a bonnet 11 disposed in the valve casing 1, wherein a slide stem 14 possessing a coupling screw part 14a is elevatably but unrotationally installed in the bonnet 11 having a coupling screw part 11c and a rotary stem 15 having concentrically the first coupling screw part 22 with threading pitch P1 inside and the second coupling screw part 23 with thread pitch P2 larger than thread pitch P1 outside is coaxially installed above the slide stem 14, and the slide stem 14 is moved vertically by the rotation of the rotary stem 15 by joining the first coupling screw part 22 to the coupling screw part 14a of the slide stem 14 and the second coupling screw part 23 to the coupling screw part 11c of the bonnet 11, whereby the slide stem 14 is moved vertically in every revolution of the rotary stem 15 by a small distance corresponding to the difference between the thread pitch P2 of the second coupling part and the thread pitch P1 of the first coupling part.

By rotating the rotary stem 15 through a handle 17 or the like, the rotary stem 15 is moved up or down while rotating, by means of the outside second coupling screw part 23 engaged with the coupling screw part 11c of the bonnet 11.

As the rotary stem 15 is moved vertically while rotating, the slide stem 14 whose rotation is prevented is moved vertically by the rotation of the inside first coupling screw part 22 engaged with the coupling screw part 14a of the slide stem 14. That is, as the rotary stem 15 makes one revolution, the slide stem 14 is raised or lowered by the difference between the thread pitch P2 of the second coupling screw part 23 and the thread pitch P1 of the first coupling screw part 22.

When the slide stem 14 goes up, the diaphragm 6 is moved up by the elastic force of the spring 10 or the diaphragm 6 itself, or when the slide stem 14 descends, the diaphragm 6 is pressed and lowered. In consequence, the effective current area of the fluid passage is adjusted directly or indirectly by the diaphragm 6, thereby controlling the flow rate of the fluid.

Referring now to the drawings, an embodiment of the invention is described in detail below:

Figure 1:
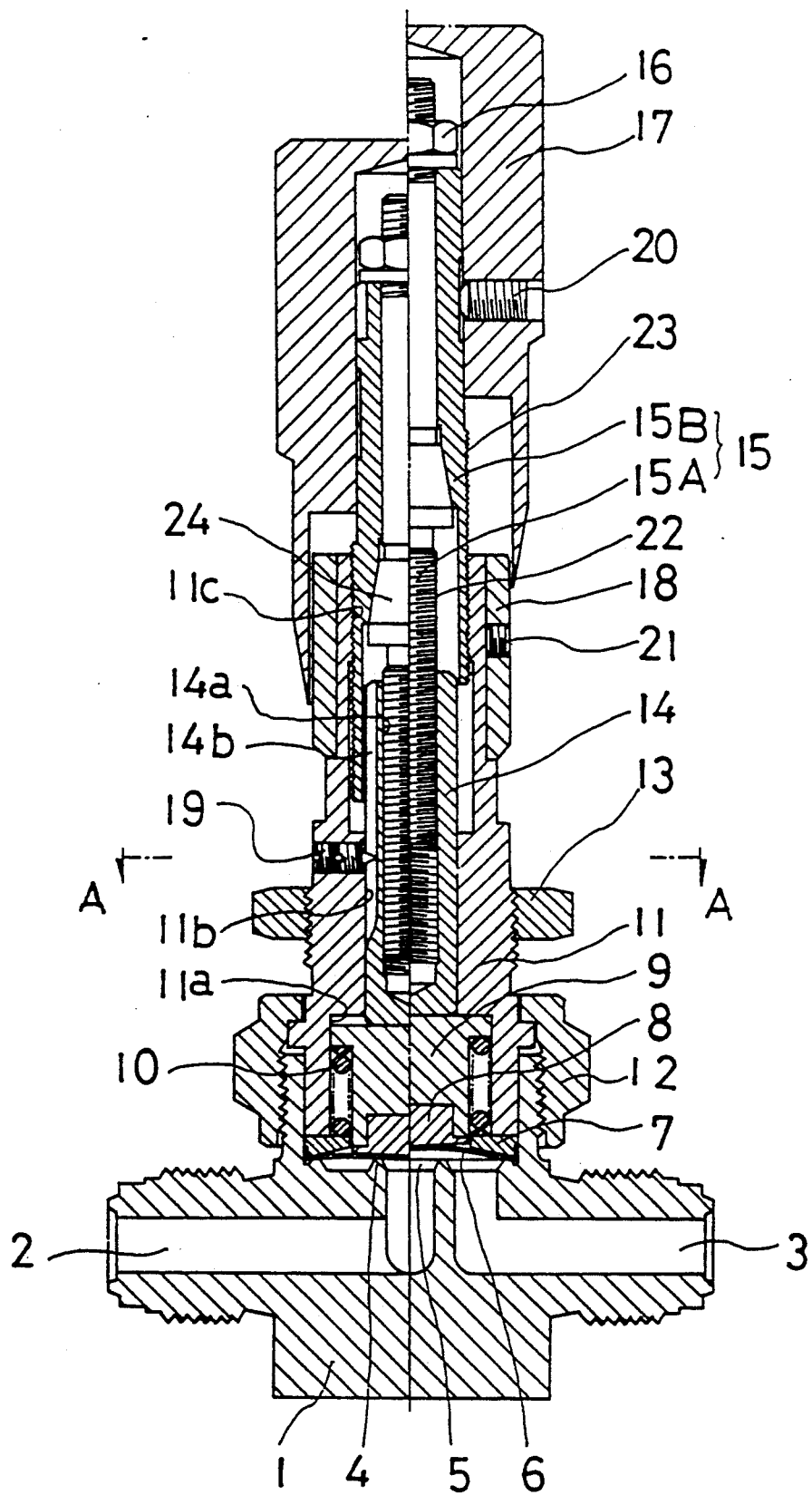
FIG. 1 is a longitudinal section of a controller of the invention in which the left half indicates the totally closed state of the controller, and the right half represents the totally opened state of the controller.
Figure 2:
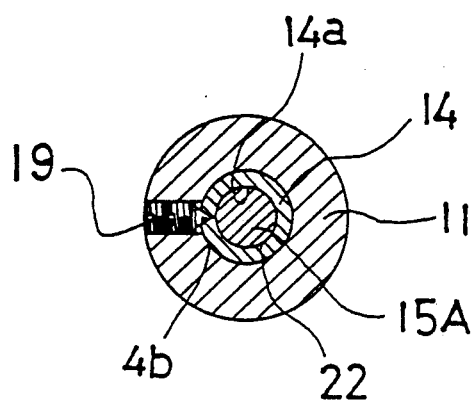
FIG. 2 is a sectional view of A—A in FIG. 1.
Figure 3:
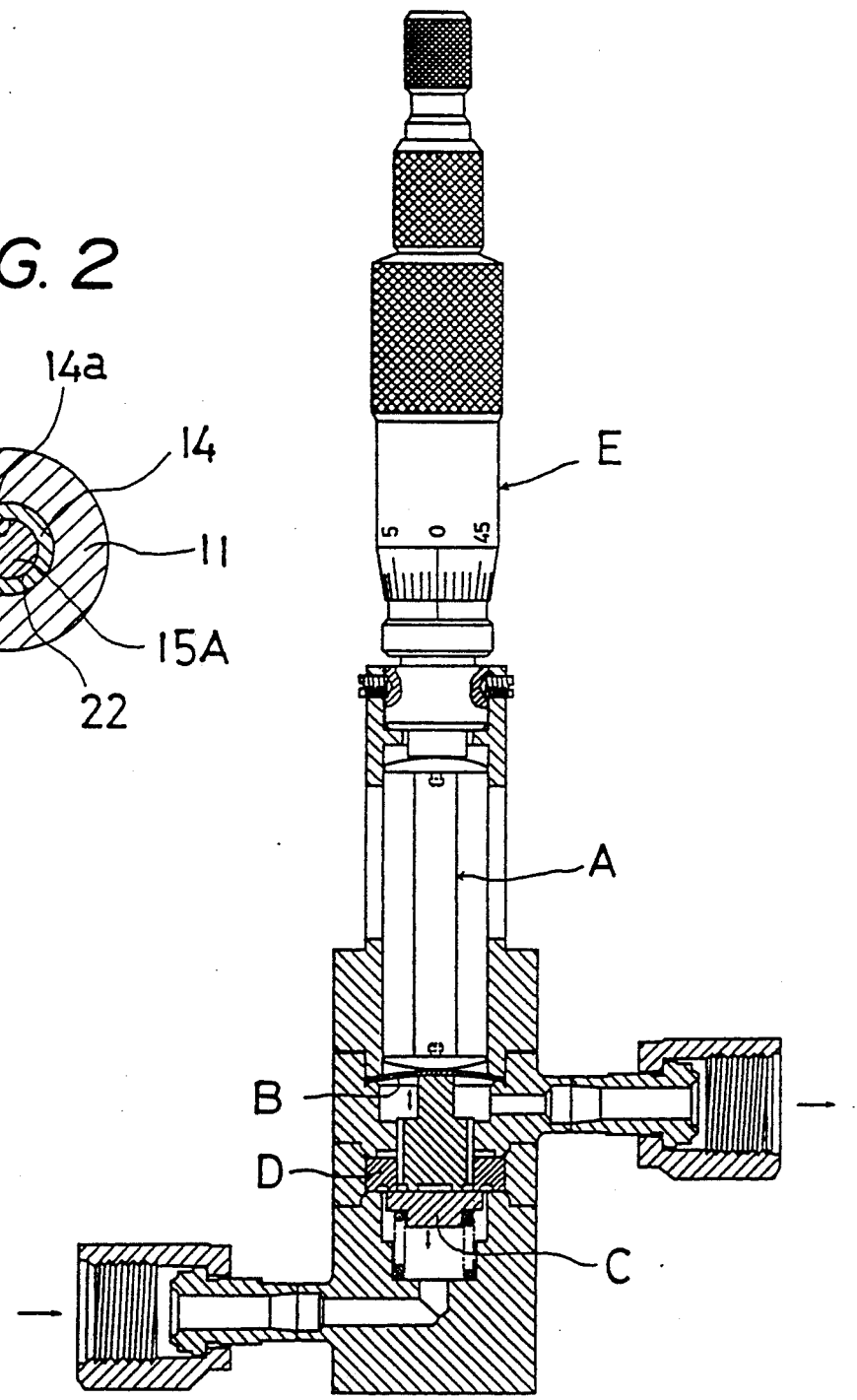

In the diaphragms, numeral 2 is a valve casing, 2 is a fluid inlet, 3 is a fluid outlet, 4 is a valve seat, 5 is a valve compartment, 6 is a diaphragm, 7 is a holder adapter, 8 is a diaphragm holder, 9 is a disc, 10 is a spring, 11 is a housing or bonnet, 12 is a bonnet nut, 13 is a panel setting nut, 14 is a cylindrical slide stem, and 15 is a rotary stem 10 threadedly engaged with the bonnet 11 and the slide stem 14, being composed of the first member 15A and the second member 15B.

Furthermore, numeral 16 is a fixing nut of the first member 15A and the second member 15B, 17 is a handle, 18 is an indicator, 19 is a locking screw, 20 is a handle fixing screw, and 21 is an indicator fixing screw.

The diaphragm 6 is of dish-shape being composed of a thin sheet of special stainless steel or the like. In this embodiment relating to a so-called direct diaphragm type valve, it is disposed in the lowest part of the valve compartment 5 so as to directly confront the valve seat 4. This diaphragm 6 is pressed to the valve casing 1 side through the holder adapter 7 made of stainless steel by the lower end plane of the bonnet 11 installed in the valve compartment 5, by tightening the bonnet nut 12 threadedly engaged with the valve casing , so as to be held and fixed air-tightly.

The diaphragm holder 8 is made of a synthetic resin material such as polyimide, and is affixed to the lower side of the disc 9. This diaphragm holder 8 presses the upper side of the diaphragm 6 as the disc 9 is pushed down by the slide stem 14, and pushes it to the valve seat 4. The diaphragm holder 8 is moved upward by the reaction of the spring 10 as the slide stem 14 is pulled upward. In the embodiment, the slide stem 14 is pushed by the elastic force of the spring 10, but it is also possible to exert this force by the fluid pressure or the reaction of the diaphragm 6. Or, instead of the structure of pushing the diaphragm 6 directly to the valve seat 4 in this embodiment, it is also possible to dispose the valve body beneath the diaphragm 6 and press it to the valve seat.

The bonnet 11 is formed in a tubular shape, and the hole in the lower part to be inserted into the valve casing 1 is formed in a large diameter, thereby forming the storing part 11a of the disc 9. The central hole of the bonnet 11 is formed with a slightly smaller diameter, thereby forming the guide part 11b for the slide stem 14. The upper hole of the bonnet 11 is formed in a relatively large diameter, and the coupling screw part 11c to be engaged with the second member 15B of the rotary stem 15 described below is formed in its inner circumference.

The bonnet 11 is inserted into the valve compartment 5 from above the valve casing 1, and by tightening the bonnet nut 12 as mentioned above, it is air-tightly fixed to the valve casing 1. On the outer circumference of the bonnet 11, a tubular indicator 18 is fitted, and it is affixed by the fixing screw 21.

The slide stem 14 is hollow, and is inserted into the stem guide part 11b of the bonnet 11 slidably from above. In the inner circumference of the hollow part of the slide stem 14, internal threads of thread pitch P1 are formed to compose the coupling screw part 14a.

The first member 15A of the rotary stem 15 mentioned later is screwed into this coupling screw part 14a. In this embodiment, the coupling screw part 14a has internal threads of diameter of 5 mm $\phi$ and pitch P1 of 0.5 mm.

In the outer circumference of the slide stem 14, a guide groove 14b is formed vertically, and the slide stem 14 is prevented from turning as the front end of the locking screw 19 is engaged in the guide groove 14b.

The rotary stem 15 is formed by integrally uniting the inside first member 15A and the outside second member 15B by tightening the fixing nut 16, and the first coupling screw part 22 with pitch P1 of external threads is formed on the outer circumference of the lower part of the inside first member 15A, and the second coupling screw part 23 with pitch P2 of external threads on the outer circumference of the lower part of the outside second member 15B, both concentrically.

The rotary stem 15 is coaxially disposed above the slide stem 14, and is mounted on the bonnet 11 by the engagement of the inside first coupling screw part 22 with the coupling screw part 14a of the slide stem 14, and the outside second coupling screw part 23 with the coupling screw part 11c of the bonnet 11.

That is, the first member 15A partly forming the rotary stem 15 has the first coupling screw part (external threads) 22 formed on the outer circumference of the lower part thereof which is engaged with the coupling screw part (internal threads) 14a of the slide stem 14, and is driven into the coupling screw part 14a from above. The upper part of the first member 15A runs upward through and sticks out of the second member 15B mentioned later, and is firmly affixed to the second member 15B by tightening the fixing nut 16, with a step part 24 disposed in the middle part engaging with the corresponding part of the second member 15B. In this embodiment, the first coupling screw part 22 is formed in the thread diameter of 5 mm and thread pitch P1 of 0.5 mm.

The second member 15B partly forming the rotary stem 15 is a hollow tubular form, and on the outer circumference in its lower part the second coupling screw (external threads) 23 to be engaged with the coupling screw part (internal threads) 11c of the bonnet 11 is formed, and it is driven inward from above the bonnet 11. In this embodiment, the second coupling screw part 23 has external threads with the diameter of 11 mm and pitch P2 of 0.55 mm. The second member 15B is coupled with the first member 15A by means of the fixing nut 16 as mentioned above, and the handle 17 is mounted on and fixed to the second member 15B by the fixing screw 20. Furthermore, the lower end part of the handle 17 is designed to rotate and move up and down along the outer surface of the indicator 18, so that the valve opening degree and flow rate adjusting degree may be indicated directly.

In this embodiment, the first member 15A and the second member 15B are separate, and both are coupled and fixed together by means of the fixing nut 16, but both may be formed integrally in one body in another example.

Meanwhile, in the foregoing embodiment, the screw coupling part of the slide stem 14 and the rotary stem 15 is in a structure of engaging the external screw 22 of the first member 15A with the internal screw 14a of the slide stem 14, but to the contrary the screw coupling parts may be so structured as to engage external threads on the slide stem 14 side with internal threads on the first member 15A side instead.

Furthermore, in this embodiment, the screw coupling of the rotary stem 15 and the bonnet 11 is in a structure of engaging the external screw 23 of the second member 15B of the rotary stem with the inner screw 11c of the bonnet 11, but to the contrary the screw coupling parts may be so formed as to engage internal threads on the second member 15B side with external threads on the bonnet 11 side instead.

In other words, the rotary stem 15 for driving the diaphragm in this invention is rotated by the handle 17 and is rotatingly moved up and down by the second coupling screw part 23 engaged with the bonnet 11, and in turn moves up and down the slide stem 14 by means of the first coupling screw part 22 engaged with the slide stem 14. By turning the handle by one revolution, the slide stem 14 is moved vertically by a distance equivalent to the difference between the thread pitch P2 of the second coupling screw part 23 and the thread pitch P1 of the first coupling-screw part 22. The rotary driving of the rotary stem 15 may be done, of course, by motor or solenoid.

The operation of the invention is described below. When the handle 17 is turned, the rotary stem 15 is rotated, and the rotary stem 15 is rotationally moved vertically by the second coupling screw part 23 engaged with the bonnet 11. As the rotary stem 15 rotates, the first member 15A rotates in consequence, and the slide stem 14 is moved vertically by means of the first coupling screw part 22 engaged with the slide stem 14 while the rotational movement of the slide stem 14 is stopped by the engagement of the locking screw 19 and the guide groove 14b.

The vertical moving distance of the slide stem 14 is equal to the differential distance of the thread pitch P2 of the second coupling screw part 23 and the thread pitch P1 of the first coupling screw part 22 when one revolution of the handle 17 has completed. As the slide stem 14 moves up and down, the disc 9 and the diaphragm holder 8 are moved up and down by the reaction of the spring 10 and the lower end of the slide stem 14, so that the diaphragm 6 is seated on or separated off the valve seat 5.

The vertical motion extent of the slide stem 14 may be read directly from the position of the lower end of the handle 17 on the indicator 18.

In the diaphragm type controller of the invention as described herein, the slide stem 14 having the coupling screw part 14a is elevatably inserted in an unrotational state into the bonnet 11 having the coupling screw part 11c, and the rotary stem 15 concentrically possessing the first coupling part 22 of thread pitch P1 and the second coupling part 23 of thread pitch P2 is coaxially disposed above the slide stem 14, and the first coupling screw part 22 of the rotary stem 15 is engaged with the coupling screw part 14a of the slide stem 14, and the second coupling screw part 23 of the rotary stem 15 with the coupling screw part 11c of the bonnet 11, thereby moving up and down the slide stem 14 in the stroke of the thread pitch difference (P2−P1) of the second coupling screw part 23 and the first coupling screw part 22.

As a result, by properly setting the thread pitch difference (P2−P1), the vertical moving extent of the slide stem 14 with respect to the revolution of the rotary stem 15, that is, the stroke of the valve body or diaphragm 15 may be adjusted very finely, so that the adjustment of a small flow rate may be achieved at a high precision.

In the invention, it is designed to drive the rotary stem 15 into the bonnet 11 and the slide stem 14 inserted in the bonnet 11, so that the structure of the control valve itself is simplified, while assembling is also easier, and moreover the height of the control valve may be shortened, so that notable downsizing may be realised.

What is claimed is:

1. A fluid flow control valve comprising a casing having a recess, a fluid inlet and a fluid outlet formed therein, said fluid inlet and fluid outlet connecting with said recess, a valve bonnet, a diaphragm, a bonnet nut for tightening said valve bonnet on said casing to thereby clamp an edge portion of said diaphragm against said casing to seal said recess, a valve seat in said recess, and means for moving said diaphragm toward said valve seat to block flow of a fluid between said inlet and outlet, said means comprising a slide stem non-rotationally slidable in said bonnet, said slid stem having an internally threaded coupling screw part, a rotatable stem having a first externally threaded coupling screw part engaging said internally threaded coupling screw part and a second externally threaded coupling screw part engaging an internally threaded coupling screw part of said valve bonnet.

2. A fluid control valve as claimed in claim 1 wherein said second externally threaded coupling screw part has a recess therein and said first externally threaded coupling part has a recess therein and said first externally threaded coupling screw part extends into said recess in said second externally threaded coupling screw part.

3. A fluid flow control valve as claimed in claim 1 and further comprising fastening means for removably fastening said first and second externally threaded coupling screw parts together.

4. A fluid flow control valve as claimed in claim 1 wherein said first and second externally threaded coupling screw parts having threads of pitch P1 and P2, respectively, P2 being greater than P1.

5. A fluid flow control valve as claimed in claim 1 wherein said outside coupling screw part extends lengthwise from an end of said bonnet, said valve further comprising a handle affixed to said rotary stem, said handle having a recess for receiving said bonnet and a wall surrounding said recess whereby said handle covers said outside coupling part and said end of said bonnet.

6. A fluid flow control valve comprising a casing having a recess, a fluid inlet and a fluid outlet formed therein, said inlet and outlet connecting with said recess, a portion of said casing forming a rim around said recess, a valve bonnet, a bonnet nut for tightening said valve bonnet toward said rim, a dish-shaped metallic diaphragm supported at its periphery on said rim, a holder adapter disposed above an edge portion of the diaphragm, said diaphragm and said holder adapter being clamped between said valve bonnet and said rim, a valve seat in said recess and having a seating surface substantially coplanar with said rim, a disc carrying a diaphragm holder and slidably movable in said valve bonnet to press said diaphragm against said valve seat, said disc having a projection thereon, a compression spring surrounding said disc, said spring being compressed between said projection and said holder adapter, a slide stem mounted for non-rotational sliding movement in said valve bonnet for pressing said disc against a force of said compression spring, said compression spring forcing said diaphragm toward said rim and biasing said disc against said slid stem, said slide stem having a slide stem coupling screw part, a rotary stem having an inside coupling screw pair of pitch P1 with external threads engaging said slide stem coupling screw part and an outside coupling screw part of pitch P2 having external threads engaging a coupling screw part of said bonnet, pitch P2 being greater than pitch P1.

* * * * *